Sept. 4, 1951  H. D. KAMMINS  2,566,524
ROASTING MACHINE
Filed Feb. 21, 1950  2 Sheets-Sheet 1
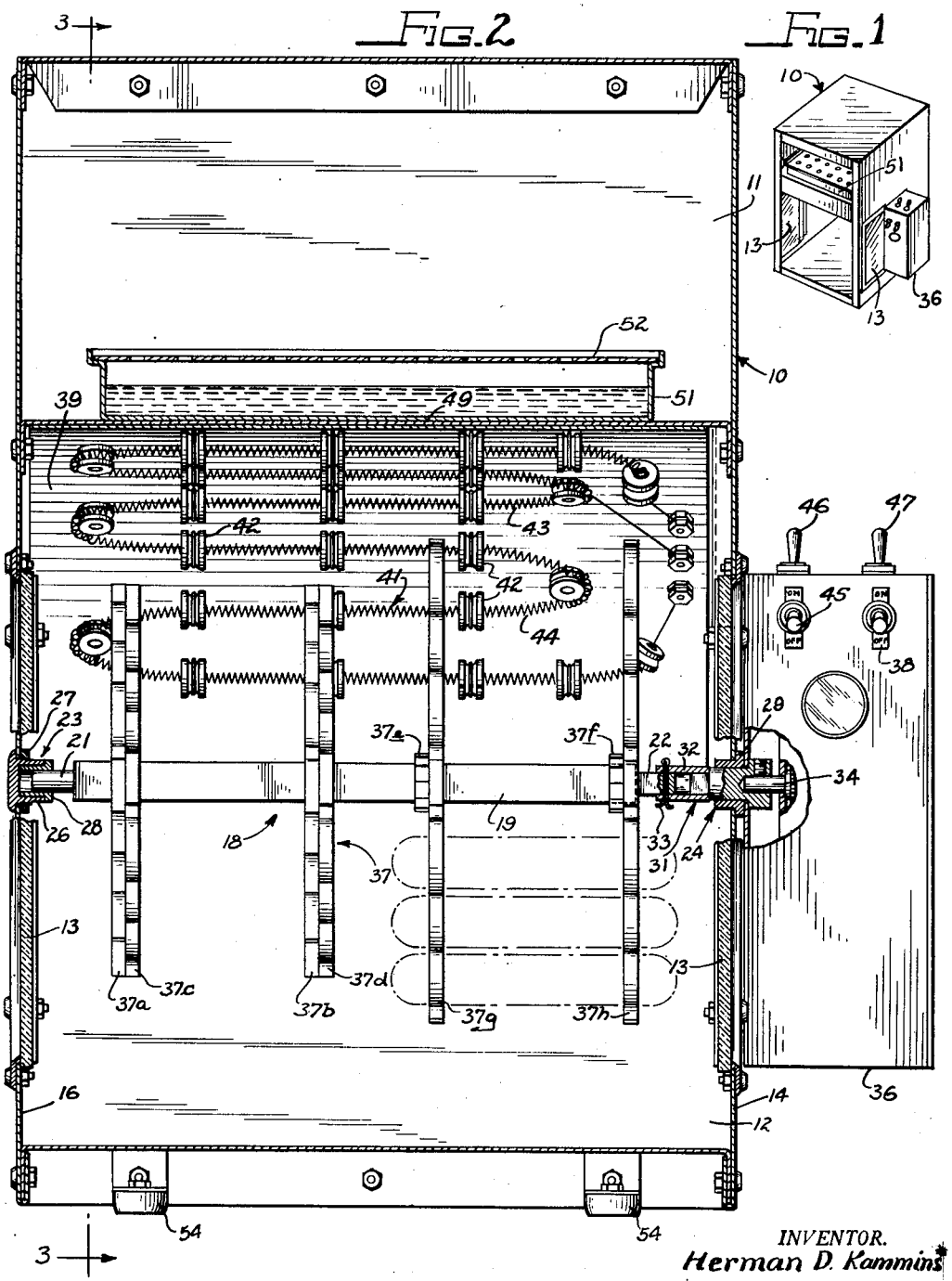
INVENTOR.
Herman D. Kammins
BY Max R. Kraus
Atty.

Sept. 4, 1951 H. D. KAMMINS 2,566,524
ROASTING MACHINE
Filed Feb. 21, 1950 2 Sheets-Sheet 2

INVENTOR.
Herman D. Kammins
BY Max R. Kraus
Atty.

Patented Sept. 4, 1951

2,566,524

UNITED STATES PATENT OFFICE 2,566,524

ROASTING MACHINE

Herman D. Kammins, Chicago, Ill., assignor to Daka, Inc., a corporation of Illinois Application February 21, 1950, Serial No. 145,477

2 Claims. (Cl. 99—427)

My invention relates to improvements in roasting machines, and more particularly to a machine for barbecuing sausages, wieners, frankfurters or the like.

One of the objects of my invention is the provision of a machine of the above type wherein a plurality of wieners or frankfurters may be supported for roasting or barbecuing without piercing of the skins thereof as with a skewer or a spit.

Another object of my invention is the provision of a roasting machine of the type described in which a continuous roasting or barbecuing operation may be performed on a large number of articles which may be successively supplied or removed, as required.

A further object of my invention is the provision in connection with the means for securing the results above referred to of a conveniently arranged storage compartment in which the rolls or buns may be heated and maintained at a desirable moist condition until removed for use.

A still further object of my invention is the provision in a roasting machine of the foregoing type of heating means selectively operable to barbecue the articles or to maintain the said articles in heated condition after the barbecuing operation has been completed.

Other and further objects and advantages of my invention will become apparent from the following description when considered in connection with the accompanying drawings in which:

Fig. 1. is a perspective view showing an embodiment of my invention.

Fig. 2 is a vertical cross sectional view thereof, on an enlarged scale, and

Figure 3:
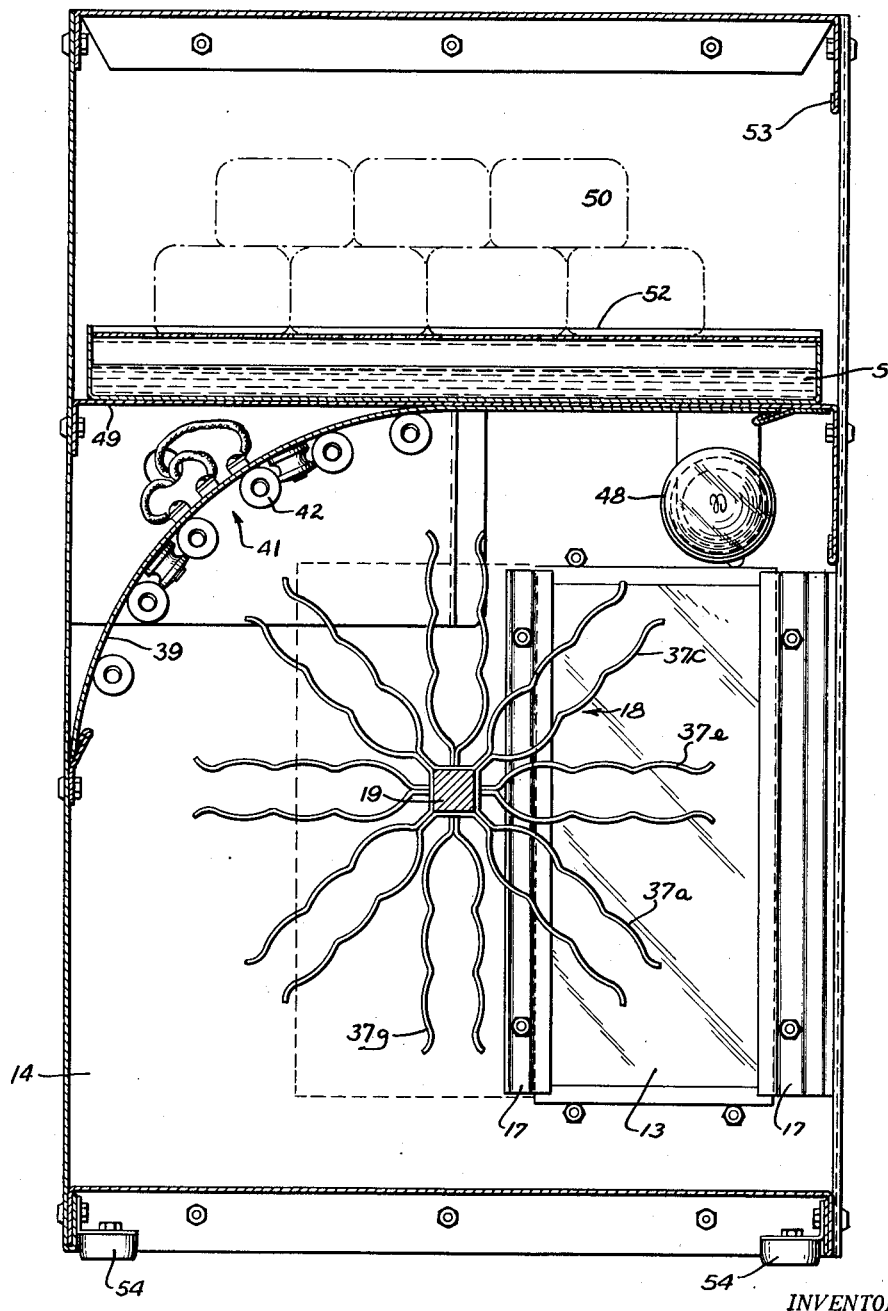
Fig. 3 is a vertical cross sectional view taken substantially on line 3—3 of Fig. 2.

Referring to the drawings, my invention is illustrated as comprising a box-like structure 10 formed of sheet metal and including an upper chamber 11 and a lower chamber 12. The lower chamber 12 is provided with window portions in the side walls 14 and 16 thereof, in which window portions are disposed panels 13 of heat proof glass, the said panels being secured in position by suitable retaining strips 17 which are fastened as by screws to the side walls of the chamber.

The article carrying member, indicated generally by the numeral 18, comprises a shaft 19 which is here shown as being substantially square in cross section and provided with journal ends 21 and 22 which are received in suitable bearings 23 and 24 supported in the side walls 14 and 16 respectively of the bottom compartment. As will be seen by reference to Fig. 2, the bearing 23 includes an externally threaded bored member 26 received in an aperture in the wall 16 and fixed thereto by a lock nut 27. A shouldered bushing 28 is received in the bore of the said member and is adapted to rotatably support the journal end 21 of the shaft 19. At the opposite side wall 14 a bushing 29 is suitably supported in an aperture in the said wall and a member 31 is rotatably supported in said bushing. The said member includes a bored portion 32 in which is received the other end 22 of the shaft 19, the said shaft being fixed to rotate with the member 31 through the use of a cotton pin or tapered pin 33 driven into registering openings in the member 31 and in the shaft end 22. The opposite end of the member 31 is also provided with a bore to receive the shaft 34 of a gear reduced driven by a motor both of which are housed in a housing 36 attached to the wall 14, exteriorly thereof. A set screw provided in the member 31 locks the shaft 34 to the said member for rotation therewith. As will be apparent by reference to Fig. 2, end clearances are provided in the members 23 and 31 to permit some axial movement of the shaft 19 so as to facilitate removal of the said shaft should the same become necessary. The motor is caused to be operated by the actuation of a switch such as 38 connected in the motor circuit.

Supported on the shaft 19 are a plurality of pairs of article clamping elements 37, the said elements being arranged in staggered relationship so as to accommodate a maximum number of said elements for the size of the compartment. For example, the pair of elements 37a and 37b are arranged in alignment with each other but are disposed at a 90 degree angle relative to the pair of elements 37c and 37d. Similarly supported at the other end of the shaft are the pair of elements 37e and 37f which are aligned with each other but are disposed at a 45 degree angle relative to the elements 37c and 37d. Adjacent the pair of elements 37e and 37f are another pair of elements 37g and 37h which are in alignment with each other and are arranged at a 90 degree angle relative to the elements 37e and 37f.

As will be seen clearly by reference to Fig. 3, each of the clamping elements 37 includes a pair of resilient metal members having their end portions formed into three connecting arcuate portions and an intermediate portion adapted to be secured on the shaft 19. Thus, when the clamping elements are in assembled relation, as shown clearly in Fig. 3, each pair of elements has provision for receiving three frankfurters in horizontal positions on each side of the shaft, whereby each pair of clamping elements can support six frankfurters therebetween. In the arrangement illustrated, the four sets of clamping elements can therefore accommodate a maximum of twenty-four frankfurters, and as a result of the staggered relationship of the pairs of clamping elements, sufficient clearance is provided between adjacent pairs of elements so as to make insertion and removal of the frankfurters highly convenient.

The rear portion of the lower chamber is provided with an arcuate wall 39 on which is carried an electrical resistance element 41 supported on suitable insulators, such as 42 fixed to the wall 39. Preferably, the resistance element may comprise a low heat portion 43 and a high heat portion 44, the said portions being independently energized so that either or both may be employed at any one time so as to vary the intensity of the heat. The said heating portions are suitably connected in circuit with switches, such as 46 and 47 which are connected to a source of electric current. A light bulb 48 may be positioned within the lower chamber for the purpose of illuminating the interior thereof, the energization of the said bulb being controlled by switch 45.

While the lower chamber 12 is shown as being open in the front thereof so as to provide access to the interior of the chamber, it is to be understood that any suitable sliding or hinged closure means may be provided to close the chamber when desired.

Supported on the panel 49 dividing the upper and lower chambers is a shallow pan 51 adapted to contain water and suitably supported on the said pan is a tray 52 which may be formed of wire mesh and on which buns or rolls 56 may be supported. It will be apparent that the heat rising from the lower chamber effects evaporation of the water in the pan and humidifies the upper chamber, thereby preventing the buns or rolls from drying out. Thus, the buns may at the same time be warmed and maintained in moist edible condition for substantially long intervals of time.

The upper chamber similarly as in the case of the lower chamber is closed on all sides except at the front and, preferably, a panel 53 may be provided at the front opening to partially close off the same.

Suitable resilient rubber-like elements 54 may be attached to the lower edges of the housing to support the same.

The operation of my improved device should be apparent from the foregoing, but briefly stated it is as follows:

A plurality of articles such as sausages, frankfurters or wieners are inserted between cooperating pairs of clamping elements 18 to assume a substantially horizontal position and upon actuation of the switch 45, the motor is energized to rotate the member 18. Substantially simultaneously, the resistance elements are energized to develop a maximum heat and after the articles have been completely roasted or barbecued only the low heat element is maintained energized so as to develop sufficient heat to maintain the articles in warm condition until removed for consumption. It will be apparent that the articles at the outer ends of the clamping elements will be subjected to more intense heat than those farther removed from the heating elements and consequently will be finished before the latter. Correspondingly, the articles in the middle of the clamping elements will be finished before those adjacent the shaft 19.

Thus, in operation, it is contemplated that the articles may be removed in sequence, starting with those disposed at the outer ends of the clamping members. It will be apparent that when a more outwardly disposed article is removed for consumption, the adjacent inwardly disposed article is more completely exposed to the heating elements 41 and cooking or roasting thereof may be completed in a relatively short time.

While only two banks of article clamping elements are illustrated it is to be understood that it is within the contemplation of my invention to provide only one bank or more than two depending upon the capacity desired.

I claim:

1. A machine for barbecuing sausage-like articles comprising a housing, a rotatable shaft mounted for rotation within said housing, driving means for rotating said shaft, heating means in the housing rearwardly of the shaft position, a plurality of pairs of alined spaced clamping elements supported on said shaft and extending radially outwardly relative to the axis thereof, said pairs of elements being angularly spaced relative to the axis of said shaft, each of said elements including two resilient fingers in spaced confronting relation to each other, each of said fingers arranged so that confronting portions of the respective fingers cooperatively define a plurality of pockets, each receiving and resiliently securing one end of a sausage-like article so that the said articles are sustained in substantially parallel relation to the axis of the shaft and in radially spaced relation to each other.

2. A machine for barbecuing sausage-like articles somprising a housing, a rotatable shaft mounted for rotation within said housing, driving means for rotating said shaft, heating means in the housing rearwardly of the shaft position, a plurality of pairs of alined spaced clamping elements supported on said shaft and extending radially outwardly relative to the axis thereof, said pairs of elements being angularly spaced relative to the axis of said shaft, each of said elements including two resilient fingers in spaced confronting relation to each other, each of said pairs of confronting fingers forming a pocket to receive and resiliently secure one end of a sausage-like article so that each of said articles are sustained in substantially parallel relation to the axis of the shaft and in radially spaced relation to each other.

HERMAN D. KAMMINS.

REFERENCES CITED

The following references are of record in the file of this patent:

UNITED STATES PATENTS

| Number | Name | Date |
|---|---|---|
| 399,561 | Rick | Mar. 12, 1889 |
| 553,363 | Sickels | Jan. 21, 1896 |
| 713,888 | Kellner | Nov. 18, 1902 |
| 1,113,473 | Noreck | Oct. 13, 1914 |
| 1,716,653 | Morrow | June 11, 1929 |
| 1,731,743 | Harrison | Oct. 15, 1929 |
| 1,809,172 | Le Sauvage | June 9, 1931 |
| 1,832,854 | Blier | Nov. 24, 1931 |
| 2,039,541 | Lekometros | May 5, 1936 |
| 2,211,024 | Nordin | Aug. 13, 1940 |
| 2,283,182 | Carl | May 19, 1942 |
| 2,470,645 | Reichart | May 17, 1949 |
| 2,477,183 | Humensky | May 26, 1950 |
| 2,506,318 | Steriss | May 2, 1950 |
| 2,514,281 | Hobbs | July 4, 1950 |